(12) United States Patent
Inserra Imparato et al.

(10) Patent No.: US 8,815,044 B2
(45) Date of Patent: Aug. 26, 2014

(54) METHOD OF MANUFACTURING SPARS, LONGERONS AND FUSELAGE BEAMS HAVING A VARIABLE H CROSS-SECTION

(75) Inventors: Sabato Inserra Imparato, Gragnano (IT); Luigi Avagliano, Baronissi (IT); Luigi Capasso, San Giorgio a Cremano (IT); Emmanuele D'Agostino, Naples (IT); Luca Di Tommaso, Marano di Napoli (IT); Gianni Iagulli, San Severo (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 184 days.

(21) Appl. No.: 13/039,936

(22) Filed: Mar. 3, 2011

(65) Prior Publication Data
US 2011/0226407 A1    Sep. 22, 2011

(30) Foreign Application Priority Data
Mar. 8, 2010   (IT) .............................. TO2010A0175

(51) Int. Cl.
*B32B 37/10*   (2006.01)

(52) U.S. Cl.
USPC ........... 156/285; 156/286; 264/511; 264/512; 264/520; 264/531; 264/571; 264/241; 264/257; 264/258

(58) Field of Classification Search
USPC ................. 156/285, 286, 156, 196, 381, 382; 264/511, 512, 520, 531, 571, 241, 257, 264/258, 264
See application file for complete search history.

(56) References Cited

U.S. PATENT DOCUMENTS

| 4,816,106 A | 3/1989 | Turris et al. |
| 5,366,684 A | 11/1994 | Corneau, Jr. |
| 5,454,895 A | 10/1995 | Imparato |

(Continued)

FOREIGN PATENT DOCUMENTS

| EP | 0 582 160 A1 | 2/1994 |
| WO | WO 2004/000643 A2 | 12/2003 |
| WO | WO 2009/037647 A2 | 3/2009 |

OTHER PUBLICATIONS

Extended European Search Report for corresponding European Patent Application 11157118.8 dated Jun. 10, 2011.

(Continued)

*Primary Examiner* — Christopher Schatz
(74) *Attorney, Agent, or Firm* — Merchant & Gould P.C.

(57) ABSTRACT

A beam of fiber-reinforced curable thermosetting composite material is preliminarily assembled in an uncured condition. The beam is placed between two forming tools, namely a lower and an upper tool, shaped in such a way as to give the lower and upper flanges a predetermined shape, at least one of the flanges having a non-rectilinear profile viewed in a longitudinal vertical plane. Two longitudinally elongate rigid inserts are placed between the flanges at the sides of the web and are covered in respective airtight tubular bags. The spaces between the upper tool and the lower tool on the two opposite longitudinal sides are sealed. The open opposite ends of the tubular bags are also sealed in such a manner that the pressure applied in an autoclave during the step of curing causes the tubular bags to swell and presses them against the two opposite faces of the web and against the flanges of the beam. On completion of curing, the upper forming tool is removed and the inserts are extracted sideways.

4 Claims, 7 Drawing Sheets

(56) References Cited

U.S. PATENT DOCUMENTS

| | | | |
|---|---|---|---|
| 5,472,653 A | 12/1995 | Onoda et al. | |
| 5,639,535 A | 6/1997 | McCarville | |
| 6,458,309 B1 * | 10/2002 | Allen et al. | 264/319 |
| 2005/0211843 A1 * | 9/2005 | Simpson et al. | 244/119 |
| 2006/0049552 A1 * | 3/2006 | Fish | 264/571 |
| 2006/0108057 A1 | 5/2006 | Pham et al. | |

OTHER PUBLICATIONS

Musch, G. et al. "Tooling with reinforced elastomeric materials", Composites Manufacturing, vol. 3, No. 2, 1992, pp. 101-111.

* cited by examiner

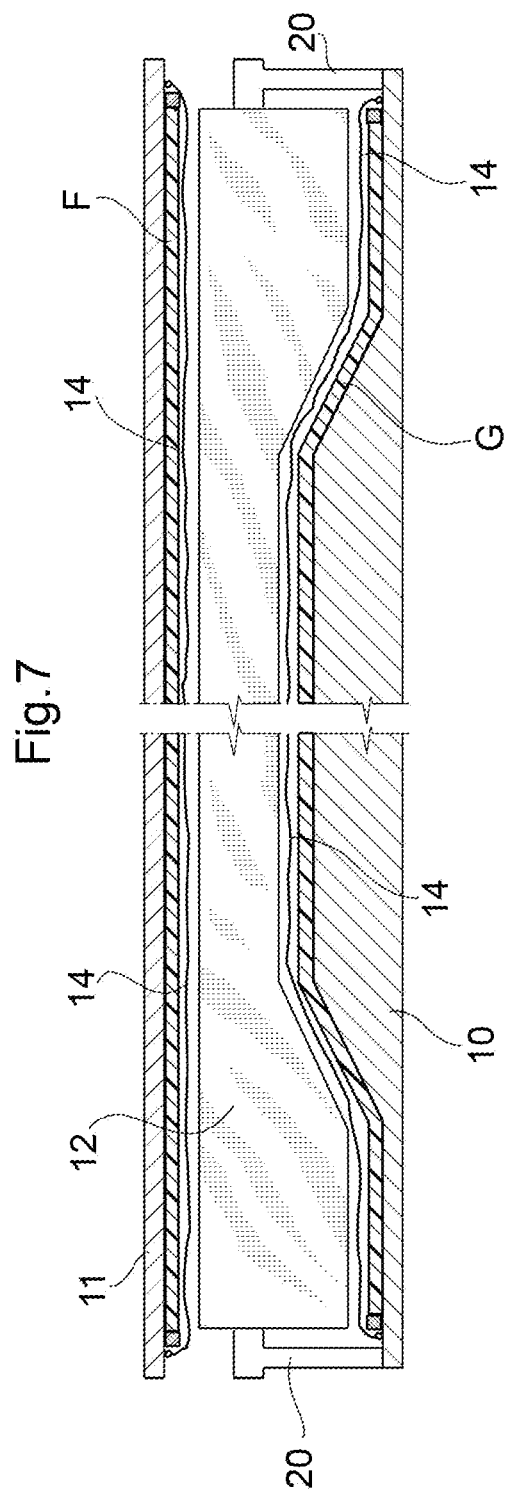

METHOD OF MANUFACTURING SPARS, LONGERONS AND FUSELAGE BEAMS HAVING A VARIABLE H CROSS-SECTION

This application claims benefit of Serial No. TO2010A000175, filed 8 Mar. 2010 in Italy and which application is incorporated herein by reference. To the extent appropriate, a claim of priority is made to each of the above disclosed applications.

The present invention relates to the field of aircraft construction in general and more specifically to a method for manufacturing beams of composite material, such as wing and empennage spars and fuselage beams, having an H-section which is variable along their length.

BACKGROUND OF THE INVENTION

In many applications, the spars or beams of an aircraft structure have an H-shaped cross section. For some specific applications, the height of the spar or beam varies in certain areas along its length, in such a way that the upper or lower flange has a non-rectilinear profile. More typically, the lower flange has to be raised in a given area, and consequently the web is locally shorter, while the shape and dimensions of the upper flange remain unchanged.

For some of these applications, for example in the case of floor beams for passenger aircraft, it is particularly important to ensure the geometric precision of the beam. Above all it is necessary to ensure the flatness of the lower flange of the H-section, since this is attached to the floor elements and the web by means of which the beam is connected to the frames of the fuselage.

Polymerization tools, also known as "matched moulds", are currently used for the manufacture of spars from composite materials, these tools being supports which can give the spar its final shape by means of the simultaneous application of pressure and heat in an autoclave. The curing tool has the task of supporting and containing the spar during these steps. The current technology is based on the use of metal mould and counter-mould tools which completely surround the component and have projections and recesses for producing the aforesaid local variations. Generally, these rigid tools are made from Invar and comprise an upper forming tool, a lower forming tool, and two lateral tools. The spar to be cured is positioned on one of the metal elements and enclosed by the other movable disassemblable elements of the equipment. All of these elements are then enclosed in what is known as a "vacuum bag", made from polyamide (nylon) film to which a vacuum is applied. This assembly is then placed in an autoclave where a combination of heat and pressure is applied with a predetermined variation over time. The pressure applied to the vacuum bag is discharged on to the metal parts of the tools, which in turn transmit the pressure to the spar. As a result of this compaction, the pressure, combined with the simultaneous temperature increase, consolidates and cures the resin.

If the components of prior art curing tools are not perfectly connected, or if their geometry does not precisely match the beam to be produced, it is possible that non-uniform pressures, higher in certain areas and lower in others, will be applied to the uncured composite material. This means that the areas of higher pressure will contain less resin, with a reduction in the local thickness of the spar, while the areas of lower pressure may be poorly compacted, possibly leading to porosity of the finished spar. This problem is particularly critical in the case of spars of variable thickness. An imperfect joint between the edge of the spar to be cured and the edge of the tool also creates empty spaces into which the resin tends to flow under pressure, thus decreasing the amount of resin in the spar and creating undesirable reductions in thickness.

U.S. Pat. No. 5,454,895, in the name of one of the present inventors, describes an apparatus and a method for manufacturing a composite box structure with an upper skin joined to a lower skin by a series of parallel spars, each formed by the joining of two opposing C-section elements. In this method, longitudinally aligned inserts are provided and are wrapped in a series of layers, namely separating films, a closed bag, and one or more breathing layers. One lower skin layer, made from fibre-reinforced curable thermosetting material (or "composite material"), is positioned on a base plate of a forming mould; the C-shaped elements of the preformed spars of the same composite material are arranged around the inserts which are wrapped as described above, and the whole assembly is then positioned on the lower skin. An upper skin of composite material is then applied above the preformed spars, and the upper plate of the forming tool is positioned above the upper skin. All of these elements are enclosed in a vacuum bag. During the step of curing in an autoclave, pressure is applied to the outer surfaces of the upper and lower skins and to the lower flanges of the spars so as to compact them against the corresponding plates of the tool, while the webs of the spars are compacted by the adjacent internal bags. Thus the inserts impart a shape to the internal tubular bags in such a way that this shape is as close as possible to the final shape of the cavity which is to be obtained. This is done in order to avoid the formation of links which could lead to the breaking of the bag during pressurization and thus create areas of increased radius. In the configuration described in U.S. Pat. No. 5,454,895, the inserts also serve to restrict the deformation of the assembly formed by each of the pairs of adjacent internal tubular bags and the webs of the spars enclosed by them. This is because, when the resin is fluidized by heat and the web of the spar could assume any shape, the walls of the adjacent inserts constrict the membrane formed by the adjacent bags and force the web of the spar to remain flat.

SUMMARY OF THE INVENTION

The object of the present invention is therefore to overcome the aforementioned drawbacks and, specifically, to enable H-section beams to be manufactured with a high degree of geometrical precision. The invention is based on a principle according to which the pressure in the autoclave is applied uniformly to all parts of the beam to be cured, and not through rigid metal parts. These and other objects and advantages, which will be made clearer below, are achieved according to the invention.

BRIEF DESCRIPTION OF THE DRAWINGS

A few preferred, but non-limiting, embodiments of the invention will now be described; reference will be made to the attached drawings, in which:

FIG. 7 is a view in longitudinal section taken along the line VII-VII in FIG. 5.

DETAILED DESCRIPTION OF THE PREFERRED EMBODIMENT(S)

Figure 1:
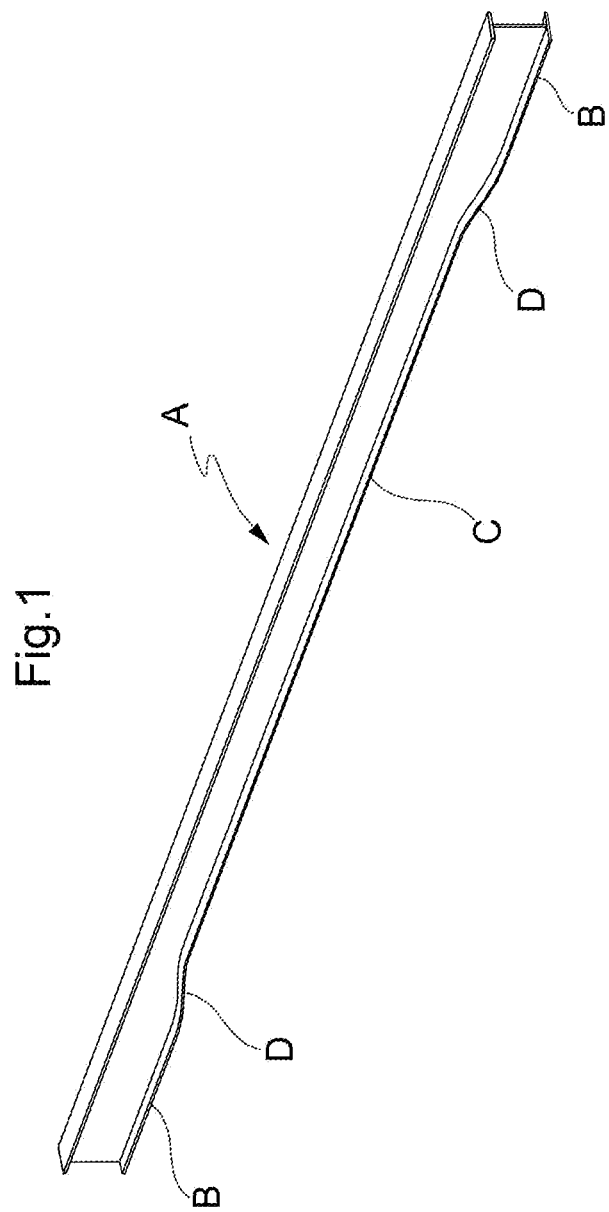
FIG. 1 is a perspective view of an example of a beam manufactured by the method of the present invention.
Figure 2:
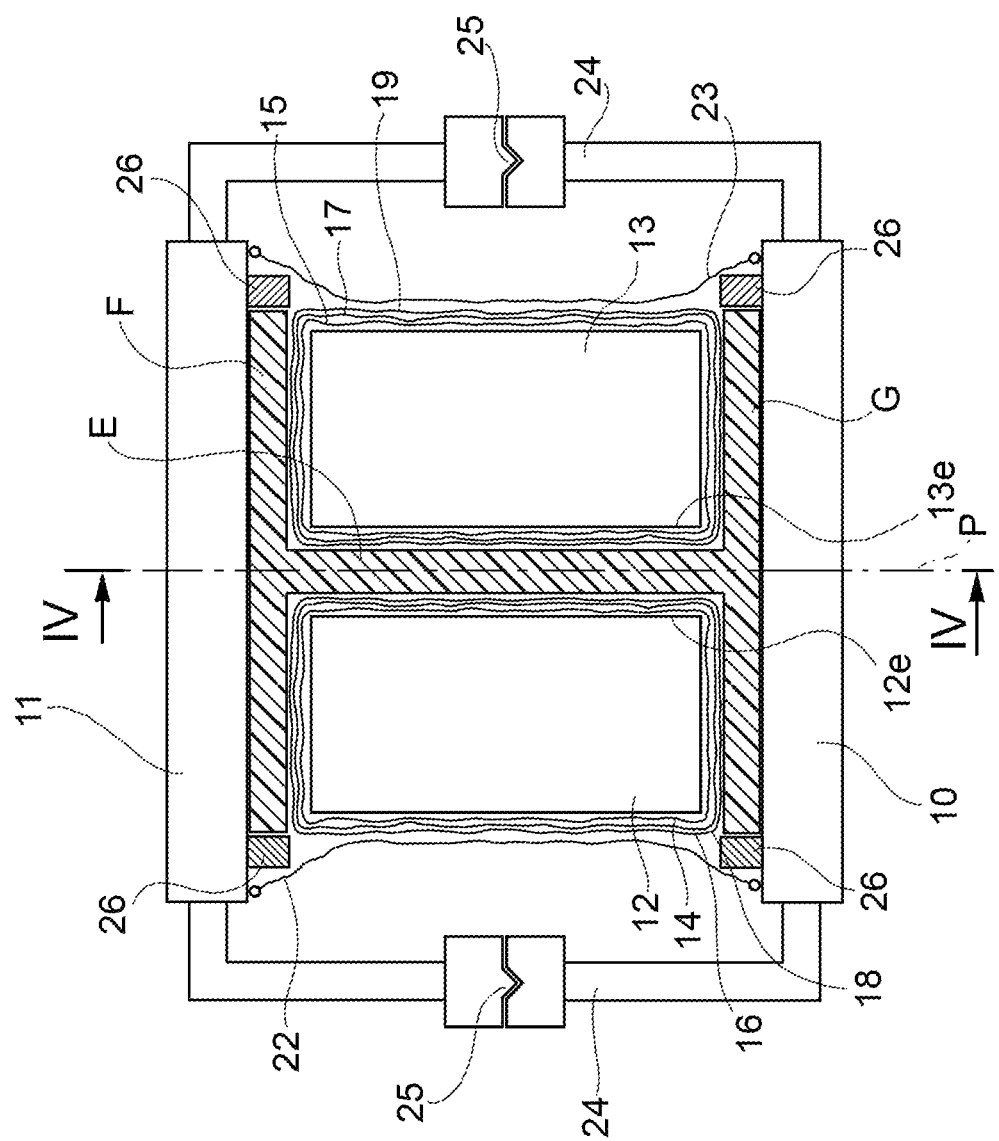
FIG. 2 is a schematic cross-sectional view of the beam of FIG. 1 and of the tools for forming it.

In order to manufacture a spar or beam A of composite material with an H-shaped cross section of the type shown in FIG. 1, it is first necessary to assemble the spar in the uncured state, using processes which are known and which are therefore not described in detail. These processes commonly include the lamination of plies preimpregnated with resin, followed by the thermoforming of two sectional elements with opposing C-shaped cross sections. A layer of adhesive is then applied along the joining area of each of the two sections, which are assembled by means of auxiliary tools, the two webs being brought together. Triangular-section fillers are then applied along the longitudinal recesses which are present in the areas of connection between the webs and flanges of the two sections, thus producing the H-section. The letters E, F and G (FIG. 2) indicate, respectively, the web, the upper flange and the lower flange of the beam A.

In the following description, reference is made in a generic way to a "beam". This term may denote either a fuselage beam or a spar of a wing or empennage. The upper and/or lower profiles of the beam are not rectilinear. The expression "upper profile" denotes the upper edge of the beam, viewed from the side, that is to say perpendicularly to the plane in which the web of the beam lies. The upper profile is delimited by the top surface of the upper flange. Similarly, the expression "lower profile" indicates the lower edge of the beam, viewed from the side; the lower profile is delimited by the bottom surface of the lower flange. In the illustrated example, the upper profile of the beam is rectilinear, while the lower profile is a broken line formed by a continuous sequence of consecutive horizontal and inclined segments. Throughout the description and the attached claims, terms and expressions indicating positions and orientations, such as "longitudinal" or "transverse", are to be interpreted with reference to the direction of extension of the beam. The beam A to be cured is positioned on a lower forming tool 10 for the lower flange of the beam. The specific embodiment shown in the drawings (see FIG. 1) refers to the manufacture of a beam which has two end portions B of greater height, an intermediate portion C in which the web is shorter and the lower flange is raised, and two transition portions D which link the intermediate portion to the end portions; in the transition portions, the lower flange is inclined. The lower forming tool 10 has an upper forming surface for giving the lower flange of the beam the aforesaid shape, and therefore has, in this case, two lowered end portions 10b, a raised central portion 10c and two linking inclines 10d. The number 11 indicates the upper forming tool, which in this example is a flat horizontal plate.

Figure 3:
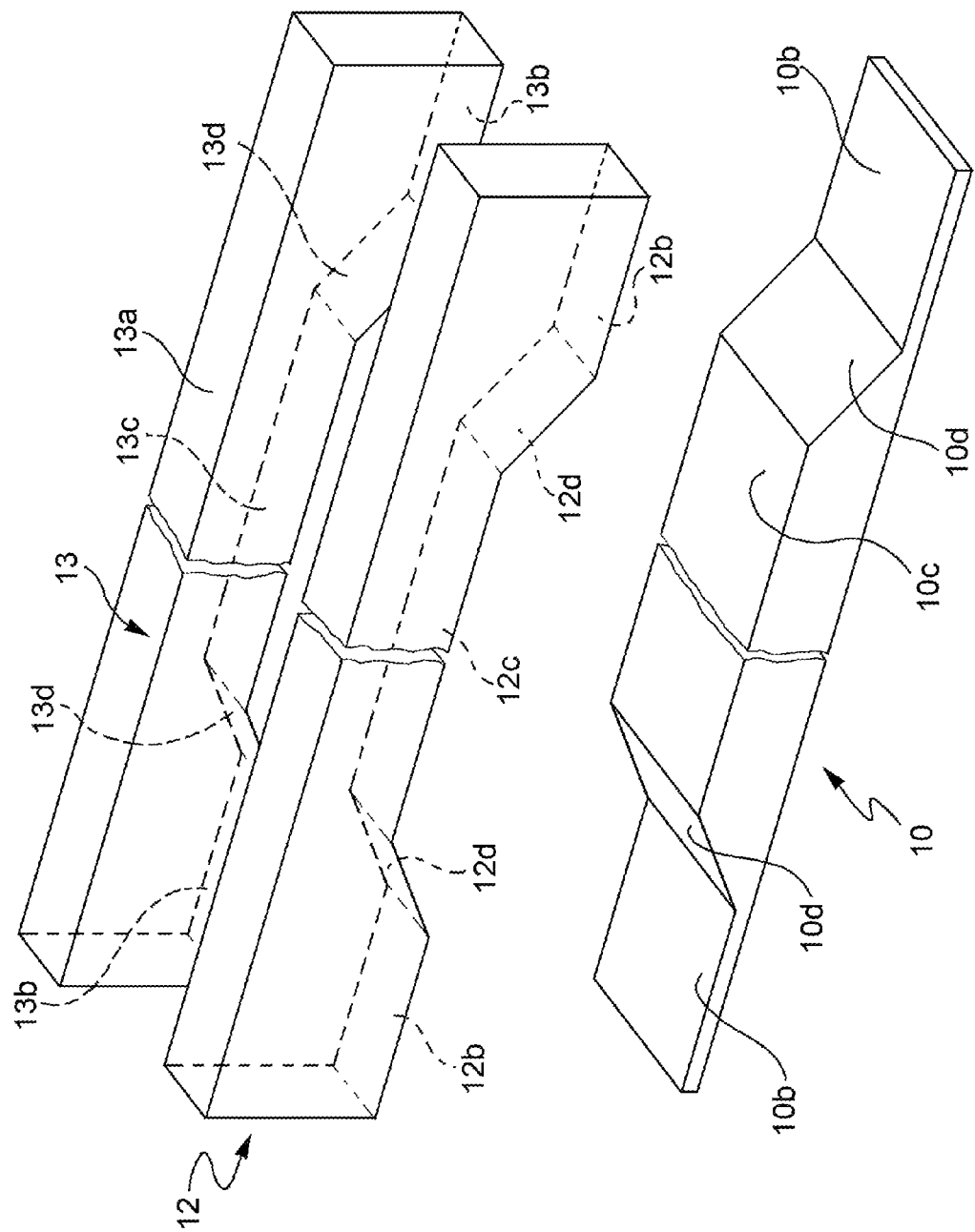
FIG. 3 is a schematic perspective view of some tools for forming the beam.
Figure 4:
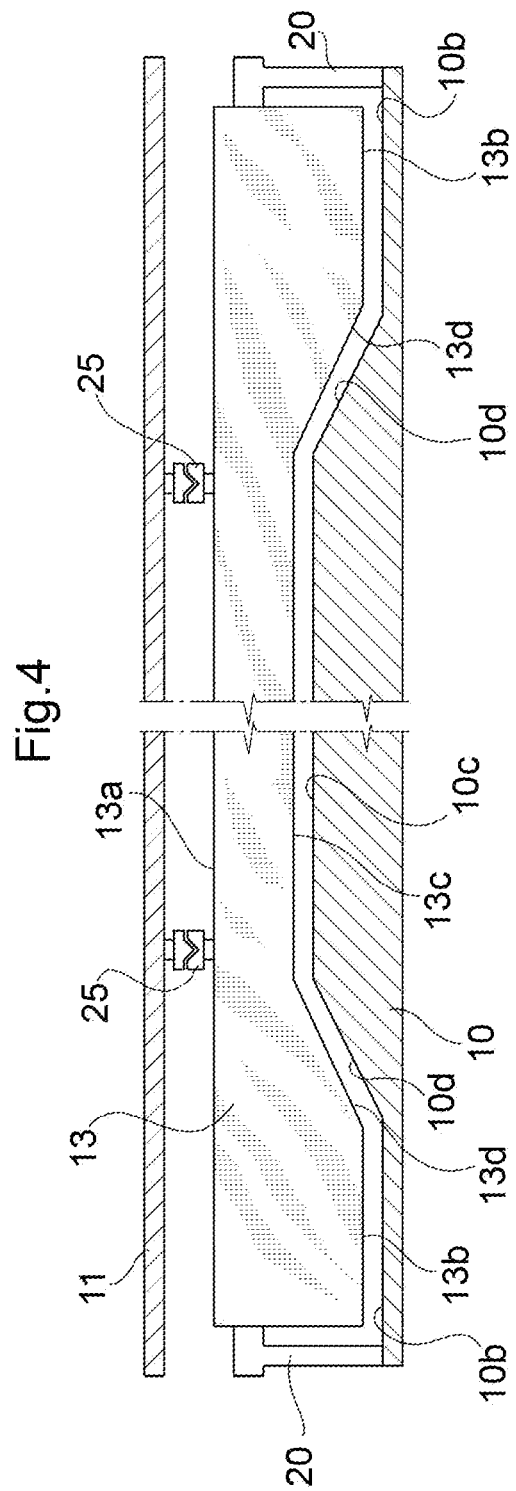
FIG. 4 is a partial view in vertical longitudinal section taken along the line IV-IV in FIG. 2, in which some parts have been omitted for the purposes of illustration.

The numbers 12 and 13 indicate two rigid inserts which are elongate in the longitudinal direction of the beam and axially symmetrical with respect to the vertical plane P in which the web of the beam lies. Each insert has a vertical cross section whose dimensions vary in one or more portions of its length, in such a way that its upper and lower faces have profiles congruent with the lower face of the upper tool and with the upper face of the lower tool respectively. Therefore, in the specific embodiment shown in the drawings (see FIG. 3), each insert has a flat rectangular upper face 12a, 13a and a lower face with two lowered end portions 12b, 13b, an intermediate raised portion 12c, 13c, and two joining inclines 12d, 13d. The upper and lower faces are linked by two lateral faces, of which one face 12e, 13e, which faces the web E of the beam in use, is flat. In the illustrated example, the lateral faces of the insert are parallel.

Each insert 12, 13 is wrapped in a series of layers, the first of which is an airtight tubular bag 14, 15, preferably made of nylon. A breather layer 16, 17, preferably made of polyester or glass fibre, is wrapped around the tubular bag. A tubular separator known as a "release film" 18, 19, preferably made of FEP, is applied on top of the breather layer. The tubular separator is sealed at both ends and the vacuum is applied to it. The separator is pressed on to the body of the insert; this produces a covered insert having a precisely defined shape.

The two inserts covered in this way are applied to the beam to be cured, placing them in the corresponding two lateral spaces or longitudinal cavities on both sides of the web E, between the upper flange F and the lower flange G. The inserts are supported at their ends by end supports 20 and if necessary by one or more intermediate supports (not shown) which bear, for example, on the lower tool 10. The intermediate supports, if provided, are suitably spaced from or equidistant from the end supports 20.

The upper forming tool 11 is then positioned above the upper flange F and is supported above the lower tool 10, preferably by means of a series of discrete supports 24, such as longitudinally spaced standards. In a preferred embodiment, the lateral standards are associated with centring means 25, of conical, pyramidal or wedge shape for example, for the precise centring of the upper tool with respect to the lower tool.

Two outer films 22, 23, preferably made of nylon, are then applied to the two opposite longitudinal sides of the tools, to provide a lateral seal of the spaces between the upper and lower tools. The option of using spaced lateral standards for supporting the upper forming tool is preferable, because it facilitates the manual operations of placing the outer lateral films 22, 23 against the outer lateral surfaces of the covered inserts 12, 13. In an alternative and less preferred embodiment, the upper forming tool is supported by two continuous vertical walls instead of by discrete lateral supports.

Figure 6:
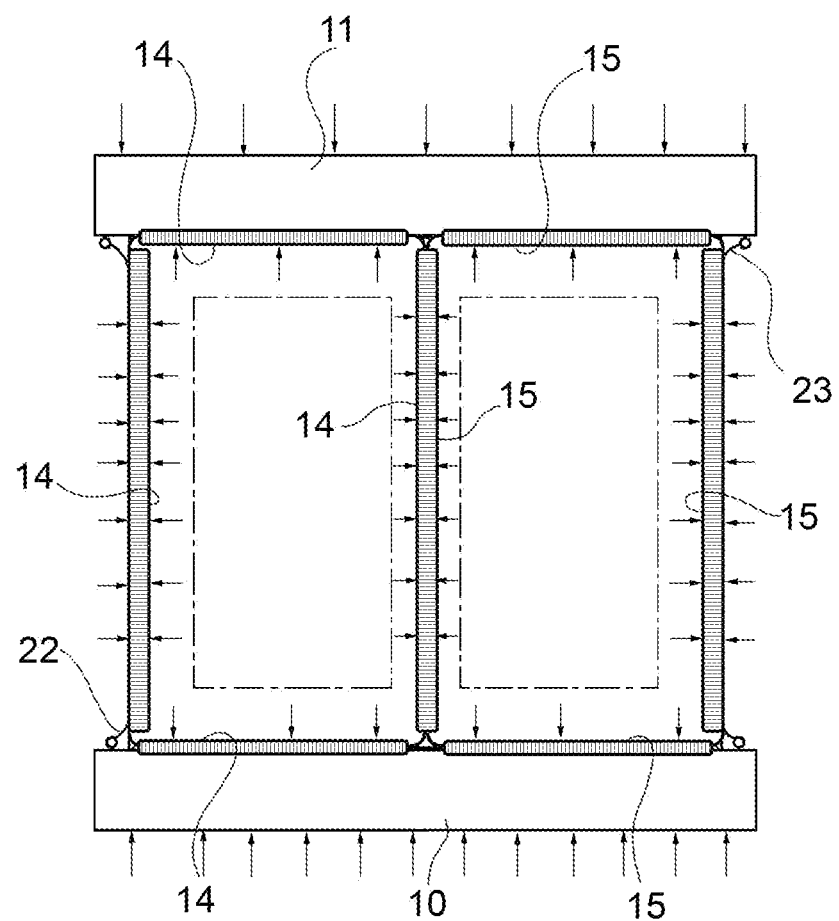
FIG. 6 is a schematic view of the sealing of certain elements of the forming tools to one of the two ends of the beam.

The opposite ends of the tubular bag 14, 15 which covers each insert are sealed as explained below, in such a way that each tubular bag forms one of the two parts of a film envelope which will transfer the pressure of the autoclave environment to the two sides of the web of the beam and to the mutually facing surfaces of the upper and lower flanges of the beam. As shown schematically in FIGS. 6 and 7, the upper edge of each of the longitudinal ends of each of the two bags 14, 15 is sealed to the upper tool 11, and the lower edge is sealed to the lower forming tool 10. The central edge is sealed to the central edge of the adjacent bag, while the outer lateral edge is sealed to the respective outer lateral film 22, 23. A vacuum is applied to the volume between each tubular bag and the other elements to which it is sealed, by means of a corresponding valve (not shown). FIG. 7 shows a cross section through this vacuum bag system and its sealing.

Figure 5:
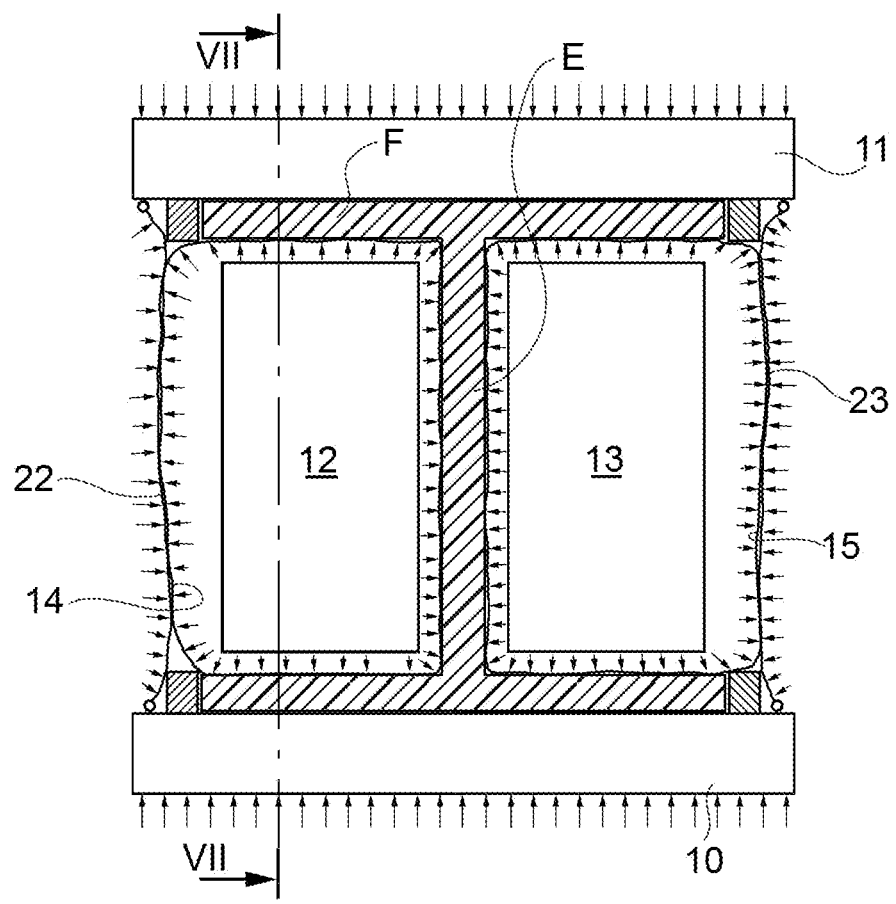
FIG. 5 is a cross section, similar to that of FIG. 2, showing the pressures acting during the step of polymerization in the autoclave.

The whole tooling with the spar held inside it is placed in an autoclave, where the requisite heat and pressure are applied according to known procedures (as indicated schematically in FIG. 5) to cure the resin of the spar. The pressure applied in the autoclave during the step of curing is uniform and causes the inner bags 14, 15 to swell, as a result of which they become detached from the corresponding inserts and compress the composite material. The inserts serve to give the inner tubular bags a shape which is as close as possible to the desired profile of the beam.

The number 26 identifies schematically illustrated dams which extend in parallel longitudinal directions and project vertically from the opposing faces of the lower and upper forming tools. These dams define the lateral edges of the flanges of the beam; in the autoclave, the dams prevent the resin from flowing from the uncured spar in response to the applied pressure.

On completion of curing, the upper plate is removed, by lifting it with a gantry crane for example. Because of the variable lower profile of the spar, the inserts cannot be drawn out longitudinally, and are therefore extracted sideways.

It will be appreciated that the invention makes it possible to manufacture beams of controlled, uniform quality, free of the defects associated with the "matched moulds" metal tools discussed in the introduction. Where certain aspects are concerned, the present invention also provides a method of manufacturing H-section beams having the same advantages in terms of quality and surface finish as those obtained for multi-beam box structures by using the process described in the cited U.S. Pat. No. 5,454,895. In particular, the invention reduces the risks of porosity and lamination defects; it also reduces the costs of cleaning and preparation incurred with conventional metal tools. The precision with which the flange surfaces are formed also reduces the costs of assembling the beam into the aircraft. It is therefore estimated that H-section composite spars and beams can be produced by the method described at a cost which is 10% lower than that of the conventional method. Finally, the possibility of producing H-section composite spars and beams with variable thicknesses and cross sections offers the designer a wider range of options for improving designs and thus reducing weight.

It is to be understood that the invention is not limited to the embodiments described and illustrated herein, which are to be considered as examples of embodiment of the method of manufacturing composite beams; in fact, the invention can be modified in respect of forms and dimensions and the arrangement of parts. For example, the method is equally applicable to the manufacture of a beam in which both the upper and the lower profiles take the form of broken lines.

What is claimed is:

1. A method of manufacturing a beam of composite material having a variable H cross section along its length, the beam including a lower flange, a flat web and an upper flange, at least one of the flanges having a non-rectilinear profile when viewed in a longitudinal vertical plane, the beam having two end portions having a first height; an intermediate portion between the two end portions, the intermediate portion having a second height less than the first height, and two transition portions linking the intermediate portion to the end portions, the lower flange being inclined in the transition portions; the method including the steps of:

preliminarily assembling a beam of fibre-reinforced curable thermosetting composite material in an uncured condition;

providing a lower forming tool having a lower forming surface having two lowered end portions, a raised central portion, and two linking inclines shaped to give the lower flange a predetermined shape;

providing an upper forming tool having an upper forming surface shaped to give the upper flange a predetermined shape;

providing releasable supporting means for supporting the upper tool above the lower tool with the upper and lower forming surfaces substantially aligned one above the other;

providing a pair of longitudinally elongate rigid inserts which are axially symmetrical about longitudinal vertical plane, wherein each of the two inserts has a lower face with a profile congruent with or corresponding to a profile of the lower forming surface, the lower face having two lowered end sections, an intermediate raised section and two joining inclines; a flat rectangular upper face with a profile congruent with or corresponding to a profile of the upper forming surface, and a side face joining the upper and lower faces;

enclosing each rigid insert in a respective airtight tubular bag;

laying the uncured beam on the lower forming tool, provisionally resting the lower flange on the lower forming surface;

fitting the two inserts into respective side spaces on two opposite sides of the web, between the upper and lower flanges, with the side faces of the inserts facing the web of the beam to be cured, and supporting the inserts with support means fixed with respect to the lower tool;

positioning the upper forming tool above the upper flange of the beam, and supporting the upper forming tool with said releasable supporting means;

sealing laterally spaces between the upper tool and the lower tool on the two opposite longitudinal sides of the beam by applying two respective outer lateral airtight films, both of the outer lateral airtight films being sealed to the upper forming surface of the upper tool and to the lower tool;

sealing open opposite longitudinal ends of both of the tubular bags in such a manner that the pressure applied in an autoclave, in a subsequent curing step, will cause the tubular bags to swell, pressing the tubular bags against the two opposite faces of the web and against pairs of mutually facing surfaces of the upper and lower flanges;

curing the beam in an autoclave by applying a programmed cycle of temperature and pressure;

upon completion of the curing, releasing the releasable support means of the upper forming tool, removing the upper forming tool, and extracting the inserts from the beam transversely to the longitudinal direction.

2. The method of claim 1, wherein the step of sealing the open opposite ends of both the tubular bags includes the steps of: sealing an upper edge of each of the longitudinal ends of each of the two bags to the upper tool, sealing a lower edge of each of the longitudinal ends of each of the two bags to the lower tool, sealing a central edge of each of the longitudinal ends of each of the bags to the central edge an adjacent one of the bags, and sealing an outer side edge of each of the longitudinal ends of each of the two bags to the respective outer lateral airtight film, wherein the upper tool is supported by a plurality of discrete longitudinally spaced apart supports, and wherein the supports for the upper tool include lateral vertical standards longitudinally spaced from one another.

3. The method of claim 1, wherein the curing step is preceded by the step of:

applying a vacuum to space between each tubular bag and other elements to which this bag is sealed.

4. The method of claim 2, wherein the standards are associated with means for centering the upper tool with respect to the lower tool.

* * * * *